United States Patent
Viswanathan et al.

(10) Patent No.: US 9,456,387 B2
(45) Date of Patent: Sep. 27, 2016

(54) METHOD AND APPARATUS FOR IMPROVING ADAPTIVE STREAMING VIDEO QUALITY BY OPTIMIZING RESOURCE ALLOCATION

(75) Inventors: Harish Viswanathan, Morristown, NJ (US); Nandu Gopalakrishnan, Chatham, NJ (US); Mark M. Clougherty, Chatham, NJ (US); Andre Beck, Batavia, IL (US); Gang Li, Bridgewater, NJ (US); Danny De Vleesschawuer, Evergem (BE); Steve A. Benno, Towaco, NJ (US); Ashok N. Rudrapatna, Basking Ridge, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 716 days.

(21) Appl. No.: 13/253,368

(22) Filed: Oct. 5, 2011

(65) Prior Publication Data
US 2013/0091248 A1 Apr. 11, 2013

(51) Int. Cl.
*G06F 15/16* (2006.01)
*H04W 28/22* (2009.01)
*H04W 72/12* (2009.01)

(52) U.S. Cl.
CPC ......... *H04W 28/22* (2013.01); *H04W 72/1236* (2013.01)

(58) Field of Classification Search
USPC ........................................................ 709/219
See application file for complete search history.

(56) References Cited

U.S. PATENT DOCUMENTS

| | | | |
|---|---|---|---|
| 2004/0057420 A1* | 3/2004 | Curcio | H04L 12/5695 370/352 |
| 2004/0208183 A1* | 10/2004 | Balachandran | H04L 12/5693 370/395.21 |
| 2006/0023629 A1 | 2/2006 | Kim et al. | |
| 2006/0182065 A1* | 8/2006 | Petrovic | H04L 47/12 370/332 |
| 2006/0285490 A1* | 12/2006 | Kadaba | H04L 47/10 370/230 |

(Continued)

FOREIGN PATENT DOCUMENTS

| | | |
|---|---|---|
| JP | 2002057707 A | 2/2002 |
| JP | 2004320775 A | 11/2004 |

(Continued)

OTHER PUBLICATIONS

International Search Report and Written Opinion for corresponding international patent application No. PCT/US2012/055282 dated Nov. 27, 2012.

*Primary Examiner* — Viet Vu
*Assistant Examiner* — James Edwards
(74) *Attorney, Agent, or Firm* — Harness, Dickey & Pierce, P.L.C.

(57) ABSTRACT

A method of allocating resources for transmitting content from a network element in a communications network to one or more mobile devices each in communication with the network element may include receiving, at the network element, characteristic information corresponding to each of the one or more mobile devices; and generating one or more adaptive guaranteed bit rate (AGBR) values at the network element corresponding to each of the one or more mobile devices, respectively. The AGBR values may be GBR values generated for each of the one or more mobile devices based on the corresponding characteristic information. A first scheduling algorithm may be executed at the network element based on the one or more AGBR values; and resources may be allocated to the one or more mobile devices based on an output of the scheduling algorithm.

20 Claims, 3 Drawing Sheets

(56) References Cited

U.S. PATENT DOCUMENTS

| | | | |
|---|---|---|---|
| 2007/0053331 A1* | 3/2007 | Kolding | H04W 72/1236 370/338 |
| 2007/0070894 A1* | 3/2007 | Wang | H04W 72/1242 370/230 |
| 2008/0068981 A1 | 3/2008 | Marinier | |
| 2009/0067335 A1 | 3/2009 | Pelletier et al. | |
| 2009/0303970 A1* | 12/2009 | Kikuchi | H04W 72/10 370/336 |
| 2010/0135229 A1* | 6/2010 | Lohr | H04W 72/1284 370/329 |
| 2011/0038325 A1* | 2/2011 | Varma | H04W 72/1226 370/329 |
| 2011/0164527 A1* | 7/2011 | Mishra | H04L 45/123 370/252 |
| 2012/0134267 A1* | 5/2012 | Noriega | H04W 72/1236 370/230 |
| 2012/0307784 A1* | 12/2012 | Heden | H04L 12/5695 370/329 |
| 2013/0114444 A1* | 5/2013 | Wu | H04B 7/0452 370/252 |

FOREIGN PATENT DOCUMENTS

| | | |
|---|---|---|
| JP | 2010527208 A | 8/2010 |
| KR | 2006-0006725 A | 1/2006 |
| WO | WO 2011/004055 | 1/2011 |

* cited by examiner

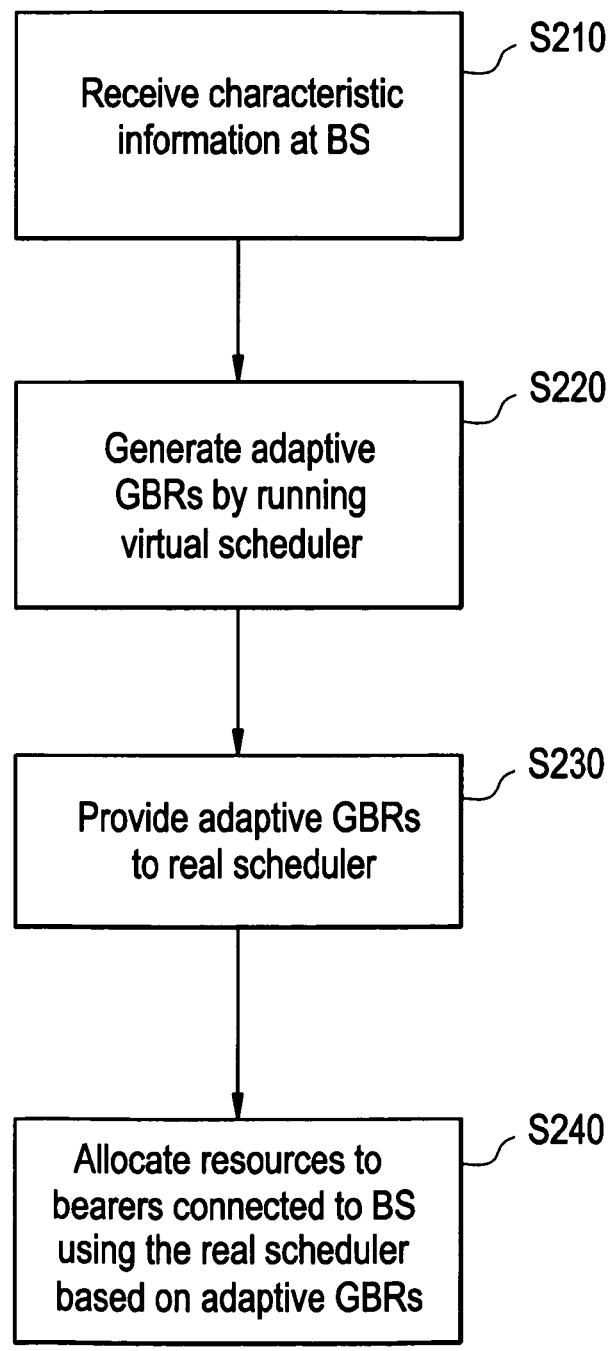

METHOD AND APPARATUS FOR IMPROVING ADAPTIVE STREAMING VIDEO QUALITY BY OPTIMIZING RESOURCE ALLOCATION

BACKGROUND

1. Field

Example embodiments of relate generally to resource allocation in wireless networks.

2. Description of Related Art

HTTP adaptive streaming (HAS) is emerging as a popular approach to streaming video on demand and real-time content. HAS is adaptive in the sense that the quality of the video can be adjusted based on the bandwidth or data rate available between the server and the client. However, each client individually adapts its video quality independent of other video users sharing the same resources.

In conventional systems, HAS streaming over mobile wireless is based on a best effort allocation of resources. The base station typically employs a proportional fair scheduler that is unaware of the HAS flow and treats HAS and other flows the same. Additionally a guaranteed bit rate (GBR) can be set and throughput for a particular flow can be guaranteed. A guaranteed bit rate (GBR) set equal to the fixed source codec rate of traditional streaming (RTP/UDP or HTTP/TCP progressive download) is known to improve quality of experience (QoE) through steady offered rate as channel and load vary.

SUMMARY

Example embodiments are directed to a method and apparatus for improving adaptive streaming video quality by optimizing resource allocation.

According to at least one example embodiment, a method of allocating resources for transmitting content from a network element in a communications network to one or more mobile devices each in communication with the network element may include receiving, at the network element, characteristic information corresponding to each of the one or more mobile devices; and generating one or more adaptive guaranteed bit rate (AGBR) values at the network element corresponding to each of the one or more mobile devices, respectively. The AGBR values may be GBR values generated for each of the one or more mobile devices based on the corresponding characteristic information. A first scheduling algorithm may be executed at the network element based on the one or more AGBR values; and resources may be allocated to the one or more mobile devices based on an output of the scheduling algorithm.

According to at least one example embodiment, a network apparatus may be configured to allocate resources for transmitting content from the network apparatus to one or more mobile devices each in communication with the network apparatus. The network apparatus may include a receiver unit configured to receive data; a transmitting unit configured to transmit data; a memory unit configured to store parameters corresponding with characteristics of the one or more mobile devices; and a processing unit coupled to the transmitting unit, the receiving unit, and the memory unit and configured to control operations associated with allocating resources to the one more mobile devices. The operations may include receiving, at the network element, characteristic information corresponding to each of the one or more mobile devices, generating one or more adaptive guaranteed bit rate (AGBR) values at the network element corresponding to each of the one or more mobile devices, respectively, the AGBR values being GBR values generated for each of the one or more mobile devices based on the corresponding characteristic information, executing at the network element a first scheduling algorithm based on the one or more AGBR values, and allocating resources to the one or more mobile devices based on an output of the scheduling algorithm.

BRIEF DESCRIPTION OF THE DRAWINGS

Example embodiments will become more fully understood from the detailed description provided below and the accompanying drawings, wherein like elements are represented by like reference numerals, which are given by way of illustration only and thus are not limiting of example embodiments and wherein:

FIG. 2 is a flow diagram illustrating a method for improving resource allocation for use with adaptive streaming.

DETAILED DESCRIPTION OF EXAMPLE EMBODIMENTS

Figure 1A:
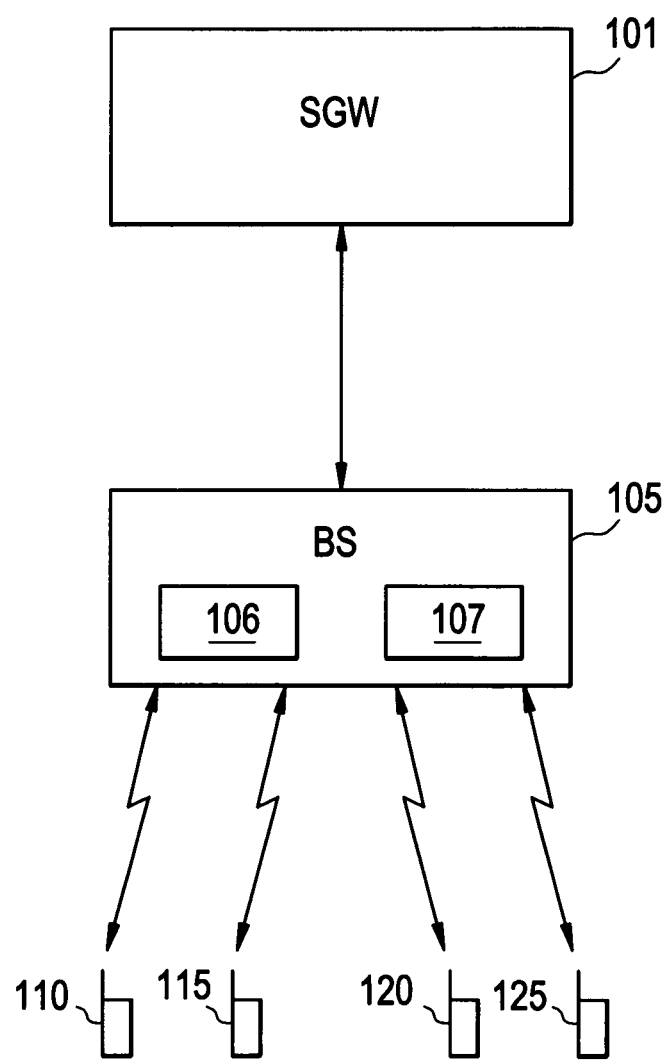
FIG. 1A is a diagram illustrating a portion of a communications network.

Various example embodiments will now be described more fully with reference to the accompanying drawings in which some example embodiments.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term mobile unit may be considered synonymous to, and may hereafter be occasionally referred to, as a terminal, access terminal (AT), mobile station, mobile user, user equipment (UE), subscriber, user, remote station, receiver, etc., and may describe a remote user of wireless resources in a wireless communication network. The term base station may be considered synonymous to and/or referred to as a base transceiver station (BTS), NodeB, enhanced Node B (eNB), femto cell, access point, etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types. The program modules and functional processes discussed herein may be implemented using existing hardware in existing communication networks. For example, program modules and functional processes discussed herein may be implemented using existing hardware at existing network elements or control nodes (e.g., an serving gate way (SGW) or base station (BS) shown in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

FIG. 1 illustrates a portion of a wireless communications network 100. Referring to FIG. 1, wireless communications network 100 includes a serving gateway (SGW) 101, and a base station (BS) 105, and a plurality of mobile devices including first through fourth mobile device 110~125. The BS 105 is connected to the SGW 101. The wireless network 100 may have multiple BSs communicating with the SGW 101, however, only one is shown for clarity. The SGW 101 is capable of routing and forwarding user data packets of mobile devices connected to the BS 105. Further, though not illustrated for the purpose of simplicity, the SGW 101 may provide access for the BS 105 to a packet data network (PDN) gateway. Further, the BS 105 may be connected to the first through fourth mobile devices 110~125, each of which may communicate wirelessly with the BS 105. Though, for the purpose of clarity, only four mobile devices are illustrated, any number of mobile devices may be connected to the BS 105.

Though, in the example illustrated in FIG. 1, wireless communications network 100 is illustrated as including an SGW and a BS, according to example embodiments, wireless communications network 100 may include any type of radio access technology capable of supporting shared resource allocation across multiple users through scheduling. Examples include, but are not limited to, LTE and EVDO radio access technology.

The BS 105 may include a real scheduler 106 which includes software and/or hardware capable of implementing a scheduling algorithm for allocating resources to users connected to the BS 105. Users connected to the BS 105, for example any of the first through fourth mobile devices mobile devices 110~125, may each be using applications which employ rate-adaptive streaming where each user analyzes the amount of bandwidth allocated to the user by the BS 105 and requests a certain coding rate of the content being streamed based on the bandwidth. One example of this rate adaptive streaming is HTTP adaptive streaming (HAS) used to stream video data, where the video data has a quality level which can be varied. For example, if the real scheduler 106 allocates a relatively high amount of bandwidth over a bearer between the user and the BS 105, the user can detect the high level of bandwidth and request video of a high quality level by, for example, requesting video encoded with a high resolution. If the real scheduler 106 lowers the amount of bandwidth allocated to the user, the user can request video of a lower quality level by, for example, requesting video encoded with a lower resolution. Though variable video rate data is discussed above, according to example embodiments, users within the communications network 100 may stream any type of rate-adaptive data including, for example, variable quality audio.

Communications network 100 may include both premium and best effort (BE) users. Premium users may each have an associated guaranteed bit rate (GBR) while best effort users may not have a GBR. Premium users generally enjoy a certain amount of priority over BE users with respect to resource allocation by the BS 105. In the example illustrated in FIG. 1, first through fourth mobile devices 110~125 represent premium users.

The scheduling algorithm implemented by the real scheduler 106 may be, for example, any known proportional fair (PF) scheduler which is capable of using guaranteed bit rates (GBR) to make scheduling decisions. One example of the scheduling algorithm implemented by the real scheduler is the known Proportional Fair with Minimum Rate (PFMR) algorithm. For example, the real scheduler 106 may receive GBR values for each of one or more users connected to the BS 105 from, for example, a corresponding application programming interface (API). According to known methods, the scheduler 106 can run a scheduling algorithm continuously over each of a plurality of slots and, for each slot, allocate resources to the users based on information including, for example, an achievable data rate, an average data rate and a GBR value of each user.

As is discussed above, according to example embodiments, in addition to the real scheduler 106, the BS 105 includes a virtual scheduler 107. The virtual scheduler 107 is capable of determining adaptive GBR values for use by the real scheduler 106 in making resource allocation decisions for users connected to the BS 105. As will be discussed in greater detail below, the virtual scheduler 107 determines adaptive GBR values by executing a GBR setting algorithm according to example embodiments. The virtual scheduler 107 may execute the GBR setting algorithm based on information regarding network and/or user-specific characteristics.

Overview of Method and Apparatus for Improving Resource Allocation for Use with Adaptive Streaming With respect to conventional methods for handling adaptive streaming in wireless communications networks, having each client adapt its video quality individually, independent of other video users sharing the same resources, can result in uneven quality of experience across a set of users watching video of different complexity over devices experiencing different user-specific factors such as different screen sizes, radio conditions, or locations relative to the base station serving the video. Employing a proportional fair scheduler that uses GBR values but is unaware of HAS flows and treats HAS and other flows the same, as in conventional systems, may not provide an optimal solution to this issue because the user-specific factors discussed above may still not be taken into account in a manner suitable for obtaining improved or optimal aggregate quality among multiple users.

Furthermore, conventional resource allocation schemes do not specifically take into account that HAS may experience degraded content quality when there is rapid or substantial amount of data rate variations introduced by load variations in the network or because of channel quality.

In view of the above, it may be beneficial to ensure that there is fair allocation of resources across the different users that will result in maximization of aggregate quality of experience across the users, while also ensuring that rapid or substantial data rate variations which may degrade quality, are reduced or prevented.

By taking into account network factors like attached cell loading (e.g., competing users) and capacity; and user-specific factors such as location of a user (e.g., good vs. bad average SINR); class of service (e.g., premium vs. best effort (BE)); video complexity (low: 'talking head' vs. high: action); screen size/image resolution (e.g., 1024×768 iPad vs. 480×320 iPhone), resources may be allocated in a way that increases or optimizes aggregate quality of experience between multiple users.

In addition, resources may be allocated in such a manner that quality degradation resulting from an excessive frequency or magnitude of data rate changes is prevented. A method and apparatus for improving resource allocation for use with adaptive streaming will now be discussed in greater detail below with respect to FIGS. 1B and 2.

Figure 1B:
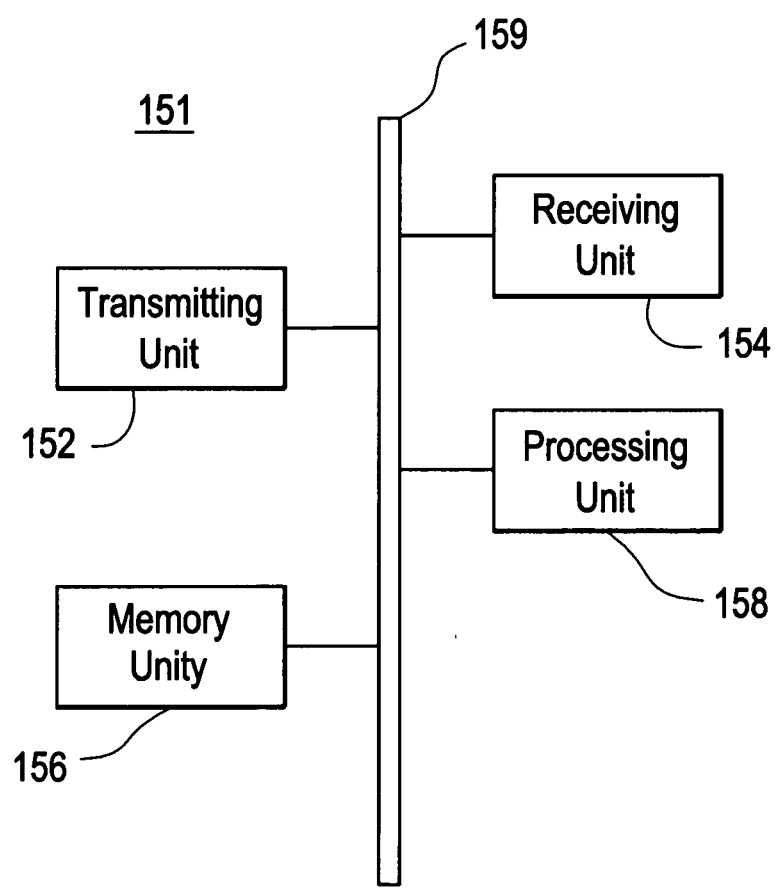
FIG. 1B is a diagram illustrating an example structure of a network element.

FIG. 1B is a diagram illustrating an example structure of a network element 151. According to at least one example embodiment, the BS 105 may have the structure and operation of the network element 151 described below. Referring to FIG. 1B, the network element 151 may include, for example, a data bus 159, a transmitting unit 152, a receiving unit 154, a memory unit 156, and a processing unit 158.

The transmitting unit 152, receiving unit 154, memory unit 156, and processing unit 158 may send data to and/or receive data from one another using the data bus 159. The transmitting unit 152 is a device that includes hardware and any necessary software for transmitting wireless signals including, for example, data signals, control signals, and signal strength/quality information via one or more wireless connections to other network elements in the communications network 100.

The receiving unit 154 is a device that includes hardware and any necessary software for receiving wireless signals including, for example, data signals, control signals, and signal strength/quality information via one or more wireless connections to other network elements in communications network 100.

The memory unit 156 may be any device capable of storing data including magnetic storage, flash storage, etc.

The processing unit 158 may be any device capable of processing data including, for example, a microprocessor configured to carry out specific operations based on input data, or capable of executing instructions included in computer readable code.

For example, the processing unit 158 is capable of implementing the operations of the real scheduler 106. For example, the processing unit 158 is capable of performing calculations necessary to execute a proportional fair (PF) scheduling algorithm which uses GBR values to allocate resources according to known methods.

As another example, the processing unit 158 is capable of implementing the operations of the virtual scheduler 107. For example, the processing unit 158 is capable of performing calculations necessary to execute the GBR setting algorithm which produces adaptive GBR values for use by the real scheduler 106.

Though, for the purpose of simplicity, the structure and operation of the network element 151 are only described above with reference to an implementation of the BS 105, according to at least one example embodiment, any or all other BSs in the communications network 100 may have the same structure and operation as the network element 105.

The guaranteed bit rate setting algorithm performed by the virtual scheduler 107 of the BS 105 according to example embodiments will now be discussed in greater detail below.

Description of Guaranteed Bit Rate Setting Algorithm

Assume i=1,2, . . . N users have been admitted for premium video service. The problem to be solved is to determine average rates $A_i$ subject to available resources so as to maximize an objective. Let $Q_i(A_i)$ be the quality level achieved for flow i with rate $A_i$. Let $\Omega_i(A_i)$ denote the resource fraction required to achieve the average rate $A_i$. Then the general problem to solve may be represented by:

$$\operatorname*{maximize}_{\{A_i\}} f(Q_1, Q_2, \ldots, Q_N) \quad (1)$$

$$\text{subject to } \sum_{i=1}^{N} \Omega_i(A_i) \leq \Pi(N), A_i^{max} \geq A_i \geq A_i^{min}$$

where Π is the total amount of resources available for the premium user class (restriction is to avoid best effort user class starvation) and is dependent on the number of users that are admitted into the premium user class. The values $A_i^{min}$ and $A_i^{max}$ are minimum and maximum average rates for user i and these limits could arise due to:

a. nominal rate limits in the HAS codec set specified in the "manifest" file; and/or b. quality saturation.

Quality saturation may refer to a data rate value range outside of which no further benefit is associated with the rate value. For example, minimum data rate $A^{min}$ may represent a data rate below which a corresponding quality level of content is not high enough for the content to be experienced properly by a user. Accordingly, there is no benefit to providing such a rate. Further, maximum data rate $A^{max}$ may represent a data rate corresponding to a maximum quality level of the content. Accordingly, there is no benefit to providing a data rate above $A^{max}$, since no additional quality improvement will be experienced by the user. Accordingly, the quality level described above may be approximately modeled as a 'flat line' quality function outside the range of average rates $[A_i^{min}, A_i^{max}]$. For example, the following simple piece-wise linear model may be used for the quality function:

$$Q_i(A_i) = \begin{cases} c_i A_i, & A_i^{min} \leq A_i \leq A_i^{max} \\ 0, & A_i < A_i^{min} \\ c_i A_i^{max}, & A_i \geq A_i^{max} \end{cases} \quad (2)$$

The user dependent constant parameters ($c_i$, $A_i^{min}$, $A_i^{max}$) influencing rate-to-quality mapping are dependent on, for example, video complexity of the scene/clip being viewed and for a given original image resolution, the screen size/resolution in use. As an example, it may be assumed that an action intensive scene requires twice as large a nominal data rate as a "talking head" variety news clip for similar perceived quality. Following this example, a user i viewing a news clip and user j watching sports action, $A_j^{max} \approx 2 A_i^{max}$.

Expression (1) represents a general form of the objective function used by the GBR setting algorithm according to example embodiments. According to example embodiments, expression (1) can be implemented by any of a number of specific functions. Two examples for the objective function will now be discussed.

First, a version of the objective function for which a goal is to increase or maximize aggregate quality will be discussed according to some logical rules which can be represented as:

$$f(Q_1, \ldots, Q_N) = \sum_{i=1}^{N} \frac{\overline{R_i}}{\overline{R}_{sector}} Q_i, \quad (3)$$

where $Q_i=m$ if $A_i=R_m^{video}$ with $R_m^{video}$ being an mth rate in the manifest file associated with the HAS content, $\overline{R}_i$ is the average of the channel quality information (CQI) received from user i, and $\overline{R}_{sector}$ is the average of such CQI reports throughout the sector.

Second, a version of the objective function for which a goal is to increase a degree to which equal resources are provided to all users i will be discussed according to some logical rules which can represented as:

$$f(Q_1, \ldots, Q_N) = \sum_{i=1}^{N} \log(Q_i) \quad (4)$$

Referring to the version of the objective function represented by expression (4), given the piece-wise linear rate-to-quality function discussed above with reference to expression (2) discussed earlier, the process of solving the objective function may be expressed as, for example:

$$\max_{\{A_i\}} \sum_{i=1}^{N} \log(A_i) \quad (5)$$

subject to $\sum_{i=1}^{N} \Omega_i(A_i) \leq \Pi(N)$, $A_i^{max} \geq A_i \geq A_i^{min}$ The above optimizations can be solved iteratively as described in the specific embodiments section.

According to example embodiments, the optimal value $A_i$ for user i obtained in the fashion described above with reference to expression (5) may be used to set the GBR used with respect to the user i by the real scheduler 106. For example, $GBR_i=A_i^*$ subject to $GBR_i >= GBR_i^{base}$, where $GBR_i^{base}$ is the base GBR value negotiated for the user or bearer and obtained from, for example, the API. The base GBR may be obtained by the BS 105 using know methods. The BS 105 may obtain the base GBR associated with a particular user or bearer i based on a signaling message received at the BS 105 including a quality of service (QoS) class identifier (QCI) or other signaling message field referencing the user or bearer i.

Step sizes or incremental resources (in virtual scheduling approaches described in the sequel) should be small enough that the adaptive GBR response is slow enough to filter out spiky inputs (e.g., competing flow(s), premium or BE, turning on and off rapidly) and fast enough to adapt to longer term variations. Still there may be a window of input variations that could cause the adaptive GBR response to oscillate significantly enough to adversely affect QoE. Thus, according to at least some example embodiments, in order to provide reduced variations in quality in the face of load changes in the network 100, a maximum bit rate (MBR) may be enforced. But setting MBR=GBR may be too restrictive. Alternatively, a more relaxed approach may be taken by setting the MBR such that $MBR_i >= GBR_i$ ensuring $MBR_i <= MBR_i^{base}$, where $MBR_i^{base}$ may be obtained, for example, from the AE API. According to example embodiments, $MBR_i$ may be adjusted based on a quality score derived from mapping the observed rate variations of a particular premium user to a formula computed mean opinion score (MOS). It may be desirable to implement the MBR (in a premium HAS video application specific manner) by throttling the flow of packets locally (as the MBR is adaptive) in the scheduler. For example, the MBR may be set to a highest possible value initially and adapted depending on the level of download rate variations observed.

It should be noted that if an application specifies a GBR (denoted by $GBR_i^{base}$) and MBR (denoted by $MBR_i^{base}$) then this shall be taken into account by ensuring that $$A_i^{min} \geq GBR_i^{base}, A_i^{max} \leq MBR_i^{base} \quad (6)$$

The algorithm above needs to take into account any caps imposed by the scheduler that prevents achieving the GBR value set. An indication such as that can be taken into account by not increasing the GBR of such users any more.

According to at least one example embodiment of the general approach outline above, we will assume that $\Omega_i(A)=\omega_i A$ for all i. In other words, the amount of resources that will be needed to achieve an average rate is linear in the rate, with the proportionality factor given by the user geometry. In particular, we will invoke ideal Shannon capacity for adaptive white Gaussian noise (AWGN) channel, $\omega_i=[\log_2(1+SINR_i)]^{-1}$. The general optimization problem can then be solved using one of the two online optimization approaches discussed below.

Virtual Scheduling Approach I

In this approach, the virtual scheduler 107 updates the rates $A_i$ in each step as though actual scheduling is being performed similar to a proportional fair scheduler like that implemented by the real scheduler 106. Based on the values $A_i$ generated by the virtual scheduler 107, the GBR values for the real scheduler 106 are periodically updated based on how the rates $A_i$ evolve in the virtual scheduler. According to at least one example embodiment, one modification to the virtual scheduling algorithm used by the virtual scheduler 107 relative to that used by a standard scheduler is that the virtual scheduler 107 takes into account the constraint on resources. Constraints on resources can be taken into account by, for example, in each slot allocating resources to, and hence updating the $A_i$ value of, the user I with the largest positive value:

$$\max_i \frac{\partial f}{\partial A_i} = R\omega_i \quad (7)$$

where R is updated according to $$R \Leftarrow R + \sum_{i=1}^{N} \Omega(A_i) - \Pi(N). \quad (8)$$

The term R is the additional term relative to standard scheduling which, according to at least one example embodiment, may be used to enforce a cumulative cap on the resources. The rate values $A_{min}$ and $A_{max}$ can be enforced according to the standard scheduling algorithm.

The new GBR values can be set according to how the $A_i$ values change in each period.

Though virtual scheduling approach I is discussed above as using a term R to aid in enforcing a cumulative cap on resources, according to at least one example embodiment, the R term and update shown above in expression (8) may not be necessary if the required cap on the resources is not cumulative but slot to slot. Note that the update represented by expression (8) above may be used so that the total resource constraint is applied on average and not instantaneously. In static channels (of a given set of users), such flexibility of imposing a cumulative cap may not net any gains. In cases where users arrive and depart and/or SNRs vary slowly in time due to user mobility, the cumulative cap approach may result in a different set of adaptive GBRs.

Virtual scheduling approach I will now be explained in greater detail with reference to an example in which the objective function explained above with reference to expressions (4) and (5) is applied to expression (7). Further, for the purpose of simplicity, the example discussed below will be discussed with reference to the case where the additional term R, discussed above with reference to expression (8), is not used.

Let the set of all premium video (adaptive GBR) users at slot index n be A(n) of size N(n). Consider an atomic unit of resource: a virtual time slot to be allocated is modeled as a droplet of fluid whose total volume is constrained. The adaptive GBR $A_i(n)$ can be calculated based on the channel condition $\omega_i^{-1}(n)$, the quality based rate limits $(A_i^{min}, A_i^{max})$ and resource constraint $\Pi(N(n))$ in accordance with the following partial algorithm:

Begin:
Initialize $A_i(0) = 0; X_i(0) = Y_i(0) = 0 \forall i$;
For $n = \{1$ to Forever$\}$ do:
Virtually schedule $$i^* = \text{argmax}_{i \in A(n)}\left(W_i(n) \frac{\omega_i^{-1}(n)}{\left(\frac{A_i(n)}{A_i^{min}}\right)^\alpha}\right), \quad (9)$$

where the value $\alpha$ represents a fairness criterion. When criterion $\alpha=1$, the equation in partial algorithm (9) represents the application of the special case of the log-utility function mentioned above with reference to expressions (4) and (5) to expression (7). A "faster" second virtual scheduler algorithm tailored to this special case will be discussed in greater detail below with reference to partial algorithms (14) and (15).

The weights are given by, for example:

$$W_i(n) = \min(Y_i(n), \max(X_i(n), 1.0)) \quad (10)$$

$$X_i(n) = \exp\left(\gamma \max(n_{max}, (n - n_i^{start})) \frac{A_i^{min} - A_i(n)}{A_i^{min}}\right);$$

$$Y_i(n) = \exp\left(\gamma \max(n_{max}, (n - n_i^{start})) \frac{A_i^{max} - A_i(n)}{A_i^{max}}\right),$$

where $n_i^{start}$ is the time slot index when the user i's session was initiated and $n_{max}$ is a suitable large constant that imposes a maximum limit on the weights. An example value for $n_{max}$ is 100. The value $\gamma$ represents scale factor or time factor which may be tuned to magnify or diminish the rate at which the $A_i$ changes. For example, if $n_{max}=100$, a desirable value for $\gamma$ would be 0.1. In general larger values for $\gamma$ correspond to faster changes in Ai, while smaller $\gamma$ values correspond to slower changes in Ai.

Using the partial algorithm (9) discussed above, adaptive GBRs may be updated for each time slot n as follows:

$$A_{i^*}(n+1) = \eta A_{i^*}(n) + (1-\eta)\omega_i^{-1}\Pi(N(n)),$$

$$A_i(n+1) = \eta A_i(n) \forall i \neq i^* \quad (11)$$

where $i^*$ represents the user or bearer achieving the maximum value with respect to the expression discussed above with reference to partial algorithm (9). during a particular time interval n, and i represents users not chosen during the time slot n. Further, the value $\eta$ represents an appropriate forgetting factor ($0<\eta<1$), as is used in the known 1xEVDO PF Scheduler IIR filter, essentially representing an interval of averaging over a preceding period where the user's fast fading averaged SNR is essentially constant, e.g., 1 or 2 seconds. A typical value for $\eta$ may be, for example, 0.999 representing of the order of a 1000 slots each of 1 ms duration as the averaging time.

The adaptive GBR updating procedure described above with reference to expression (11) involves a factor that ensures that a single slot/block of resource represents a maximum of $\Pi(N(n))$ available symbols, i.e., the resource constraint is treated as a peak bandwidth constraint at every scheduling instant.

With respect to providing the adaptive GBR values $A_i$ to the real scheduler 106 for use in allocating resources, in order to prevent excessively frequent changes in the GBR values used by the real scheduler 106, the adaptive GBRs Ai may be provided from the virtual scheduler 107 to the real scheduler 106 in a staggered manner. For example, adaptive GBR values $A_i$ may be provided to the real scheduler 106 in accordance with the remaining steps of partial algorithm (9) which may be represented as follows:

```
For i = {1 to N} do                                              (12)
   If n mod NumVirtualSlotsBlocks = stagger_i
      Return(A_i(n)); // Return adaptive GBR for user i
      to actual scheduler
   Endif
Endfor // loop over user index i
Endfor // loop over virtual time index n
End // virtual scheduler 1.
```

The value, stagger$_i$ may represent a user specific time index shift chosen in the range [0, NumVirtualSlotsBlocks−1]. The value NumVirtualSlotsBlocks may represent the number of resource elements sequentially available to the virtual scheduler for computing "converged" adaptive GBRs. For example, NumVirtualSlotsBlocks may represent the number of virtual scheduler iterations per update of GBRs in the actual scheduler. Typical value for NumVirtualSlotsBlocks could be 2000 slots. Thus, according to the algorithm explained above with reference to partial algorithms (9) and (12), adaptive GBR values $A_i$ may only be provided by the virtual scheduler 107 to the real scheduler 106 every 2000 slots.

Virtual Scheduling Approach II:

Now an alternative simpler virtual scheduler approach will be discussed that exploits "structure" specific to the log utility function—unconstrained fair allocation preferring the least allocated currently or else minimally unfair constrained allocation. This approach resembles virtual scheduling approach I discussed above in the sense that resource allocation is incremental, but also exploits the fact that equal allocation (subject to the GBR and MBR boundary conditions) is optimal. Virtual scheduling approach I does not take this special property into account when incrementally allocating resources, but lets the objective drive it, and hence is expected to involve more computation and time to convergence.

In the first virtual PF scheduler ($\alpha=1$) over AWGN channels, $$\max_i \left( W_i(n) \frac{\omega_i^{-1}(n)}{A_i(n)} \right);$$

channel spectral efficiency (SE), $\omega_i^{-1}(n) = \log_2(1+\mathrm{SINR}_i(n))$, throughput $A_i(n) = f_i(n)\log_2(1+\mathrm{SINR}_i(n))$ where $f_i(n)$ is the average number of symbols allocated so far to i; the SE term in the numerator and denominator cancel and there too, modulo the weight $W_i(n)$, we are allocating that incremental resource to user with lowest allocation. However, the process of finding the $W_i(n)$ (driven by errors to rates $A_i^{min}$ and $A_i^{max}$) is a bit less well directed and will be slower to converge as opposed to the following new scheme that knows which users or bearers i not to over-allocate or under-allocate (based on states $A_i^{min}$ and $A_i^{max}$) in each step.

In virtual scheduling approach II, the adaptive GBR $A_i(n)$ is alternatively calculated based on the channel condition $\omega_i^{-1}(n)$, the quality based rate limits ($A_i^{min}$, $A_i^{max}$) and resource constraint $\Pi(N(n))$ as follows:

```
Begin:                                                           (13)
   Initialize A_i(n) = 0 ∀ i;
   For n = {1 to Forever} do: // virtual time loop
      Construct set U = {i : A_i(n) < A_i^min} // the unsatisfied set
      If U ∉ φ, allocate slot (or block) to i* = argmax_U ( (A_i^min − A_i(n)) / A_i^min );
      /* incrementally allocate to user in unsatisfied set with largest
         percent min GBR error;
                       alternatively we could have just allocated to
         user in U with lowest A_i(n), i.e., i* = argmin_U(A_i(n)); the first
         alternative will be more balance especially when there is no
         solution to the problem, i.e., U is perennially non-empty* /
      Else // (excess resources allocation):
         Construct set O = {i : A_i(n) > A_i^max} // the over-satisfied set
         If (A(n) − O) ∉ φ,
                       allocate slot (or block) to i* = argmin_{A(n)−O}(A_i(n));
         /* exclude the over-satisfied and un-satisfied users and from
            among those remaining
            alloate to the user with least allocation fraction so far.* /
```

Using the partial algorithm (13) discussed above, adaptive GBRs may be updated for each time slot n as follows:

$$A_{i^*}(n+1) = \eta A_{i^*}(n) + (1-\eta)\omega_i^{-1}\Pi(N(n)) \; A_i(n+1) = \eta A_i(n) \quad \forall i \neq i^*, \tag{14}$$

where i* represents the user or bearer chosen for resource allocation during a particular time interval n, and i represents users not chosen during the time slot n. Further, the value $\eta$ represents an appropriate forgetting factor ($0<\eta<1$), as is used in the known 1xEVDO PF Scheduler IIR filter, essentially representing an interval of averaging over a preceding period where the user i's fast fading averaged SNR is essentially constant, e.g., 1 or 2 seconds. The choice $\eta=(1-1/n)$ is applicable only in the strictly stationary case.

With respect to providing the adaptive GBR values $A_i$ to the real scheduler 106 for use in allocating resources, in order to prevent excessively frequent changes in the GBR values used by the real scheduler 106, the adaptive GBRs Ai may be provided from the virtual scheduler 107 to the real scheduler 106 in a staggered manner. For example, adaptive GBR values $A_i$ may be provided to the real scheduler 106 in accordance with the remaining steps of partial algorithm (13) which may be represented as follows:

```
For i = {1 to N} do                                              (15)
   If n mod NumVirtualSlotsBlocks = stagger_i
      Return(A_i(n)); // Return adaptive GBR for user i to scheduler
   Endif
Endfor // loop over user index i
Endfor // loop over virtual time index n
End // virtual scheduler II.
```

As is discussed above with reference to the algorithm represented by partial algorithms (9) and (12), the value, staggers may represent a user specific time index shift chosen in the range [0, NumVirtualSlotsBlocks−1]. The value NumVirtualSlotsBlocks may represent the number of resource elements sequentially available to the virtual scheduler for computing "converged" adaptive GBRs. For example, NumVirtualSlotsBlocks may represent the number of virtual scheduler iterations per update of GBRs in the real scheduler 106. Typical value for NumVirtualSlotsBlocks could be 2000 slots. Thus, according to the algorithm explained above with reference to partial algorithms (13) and (15), adaptive GBR values $A_i$ may only be provided by the virtual scheduler 107 to the real scheduler 106 every 2000 slots.

Quantizing the Virtual Scheduler Outputs

In order to avoid abrupt changes to user rates (and qualities experienced by users), according to example embodiments, the effects of load variations can be cushioned as users arrive and depart. For example, an output of the virtual scheduler 107 may be quantized such that changes in a GBR currently used by the real scheduler 106 take place only by moving up or down by a step size, or by not changing at all, for each user depending on the adaptive GBR $A_i$ generated by the virtual scheduler 107 for each user or bearer i.

Given $A_i(k)$, adaptive GBR generated by the virtual scheduler 107 at some appropriate time index k of updating user i's GBR, let $A_i^{actual}(k-1)$ be the corresponding GBR used by the real scheduler 106 for user i just prior to the update. Then the component-wise update of the GBR may be given by:

$$A_i^{actual}(k) = A_i^{actual}(K-1) \times \delta \quad (16)$$

where $$\delta = \begin{cases} 1, \text{ if } 0.5 \leq \dfrac{A_i(k)}{A_i^{actual}(k-1)} \leq 1.5 \\ 1.5, \dfrac{A_i(k)}{A_i^{actual}(k-1)} > 1.5 \\ 0.5, \dfrac{A_i(k)}{A_i^{actual}(k-1)} < 0.5. \end{cases} \quad (17)$$

Further, for the case where δ=1 the GBR used by the real scheduler 106 may be further defined as follows:

$$\text{If } A_i = A_{min}, \text{ then } A_i^{actual} = A_{min} \quad (18)$$

$$\text{If } A_i = A_{max}, \text{ then } A_i^{actual} = A_{max} \quad (19)$$

The step size is a three valued function whose value is determined based on the current value of the actual GBR and whether it falls short/exceeds/stays within small range of $A_i(k)$. Thus, as is described above with reference to expressions (16)-(19), according to at least one example embodiment, a current adaptive GBR value provided by the virtual scheduler 107 for use by the real scheduler 106 will be quantized as one of a 50% reduction, a 50% increase or 0 change with respect to a previous actual GBR value used by the real scheduler 106. Accordingly, abrupt changes to user rates and/or qualities experienced by users may be avoided.

Example Method for Improving Resource Allocation for Use with Adaptive Streaming FIG. 2 is a flow diagram illustrating a method for improving resource allocation for use with adaptive streaming.

The method illustrated in FIG. 2 will be discussed below with reference to an example where first through fourth mobile devices 110-125 are currently using HAS to stream variable rate video content through a plurality of bearers (bearers 1-4) connected between each of the first through fourth mobile device 110-125 and the BS 105, respectively. Further, in the example below, the virtual scheduler 107 is implementing the GBR setting algorithm according virtual scheduling approach I discussed above with reference to expressions (7)-(12). Though, virtual scheduling approach I is used as an example, according to example embodiments, the virtual scheduler 107 may implement the GBR setting algorithm based on any algorithm capable of providing rates $A_i$ such that an aggregate quality value $Q_i$ for a plurality of GBR users i is increased or optimized, for example, in the manner discussed above with respect to expression (1). For example, the virtual scheduler 107 may implement the GBR setting algorithm based on virtual scheduling approach II discussed above with reference to expressions (13)-(15).

Further, according to at least one example embodiment, each of the operations illustrated in, or described with respect to, FIG. 2 as being performed by a BS may be performed by, for example, one or more BSs having the structure of the network element 151 as illustrated in FIG. 1B. For example, the memory unit 156 may store executable instructions corresponding to each of the operations described below with reference to FIG. 2. Further, the processor unit 158 may be configured perform each of the operations described below with respect to FIG. 2. Further, according to at least one example embodiment, transmitted data and/or control signals may be transmitted through the transmitting unit 152, and received data and/or control signals may be received through the receiving unit 154.

Referring to FIG. 2, in step S210, the BS 105 receives characteristic information corresponding each of the first through fourth mobile devices 110~125. The characteristic information may include, for example, QCI information for each corresponding bearer of the first through fourth mobile devices 110~125. The QCI information may be delivered to the BS 105 by known methods. Further, the characteristic information for each of each of the first through fourth mobile devices 110~125 may include information regarding location/signal quality of the mobile device (e.g., good vs. bad average SINR); a class of service of the mobile device (e.g., premium vs. best effort (BE)); a complexity of content associated with the mobile device (e.g., for video content, low: 'talking head' video vs. high: action video); and screen size/image resolution of the mobile device (e.g., 1024×768 smart phone vs. 480×320 tablet device). The characteristic information may be provided to the BS 105, for example, by way of the SGW 101.

For example, the characteristic information may be provided to the BS 105 in accordance with an example system and method described in A METHOD AND SYSTEM FOR RATE ADAPTIVE ALLOCATION OF RESOURCES, by C. Kahn, H. Viswanathan, M. Clougherty, and Andre Beck, U.S., Ser. No. 13/253,393, filed on Oct. 5, 2011, the entire content of which is incorporated herein by reference.

The characteristic information may be used by the BS 105 to generate quality mapping information for each corresponding bearer of the first through fourth mobile devices 110-125. The quality mapping information may be of the same type described above with reference to expression (2). The quality mapping information may define quality-to-rate relationships and constant values for each of bearers 1-4. Using bearer 1 between the first mobile device 110 and BS 105 as an example, the quality mapping information may define a quality-to-rate relationship between a quality value $Q_1$ and a rate $A_1$ for the bearer 1; the quality mapping information may define constant values including $c_1$, and maximum and minimum rate values $A_1^{max}$ and $A_1^{min}$ for the bearer 1.

In step S220, the BS 105 generates adaptive GBR values by running a GBR setting algorithm at the virtual scheduler 107. For example, the virtual scheduler 107 may implement the algorithm described above with reference to partial algorithms (9) and (12) by updating, in accordance with expression (11), adaptive GBRs $A_i$ (where i=1, 2, 3, 4) at each time slot n.

In step S230, adaptive GBR values are provided from the virtual scheduler 107 to the real scheduler 106. For example, as is described above with reference to partial algorithm (12), after each set of slots equal to the value NumVirtualSlotsBlocks, which may be, for example, 2000 slots, adaptive GBRs $A_1$, $A_2$, $A_3$ and $A_4$ (corresponding to bearers 1, 2, 3 and 4 of first thorough fourth mobile units 110~125) generated by the virtual scheduler 107 may be provided to the real scheduler 106. Further, in accordance with at least one example, embodiment, before the adaptive GBRs $A_1$, $A_2$, $A_3$ and $A_4$ are provided to the real scheduler 106, the virtual scheduler 107 may quantize the adaptive GBRs $A_1$, $A_2$, $A_3$ and $A_4$ in the manner discussed above with reference to expressions (16) and (17).

In step S240, the BS 105 may allocate resources to the plurality of bearers 1-4 by running a PF scheduling algorithm at the real scheduler 106 where the PF algorithm uses, as GBR values for bearers 1-4, the adaptive GBR values provided by the virtual scheduler 107 in step S230.

Once the resources have been allocated to the plurality of bearers 1-4, the data may be transmitted to the first through fourth mobile devices 110-125, via the bearers 1-4, in accordance with the allocation of resources.

According to example embodiments, resources may be allocated to a plurality of users including users executing application that use HAS flows. Bit rates may be guaranteed in the face of contention for resources from other users in order to keep video quality stable. Further, variations in quality due to load changes in the network caused by events such as users coming into or leaving the system may be reduced by slow adaptation of the delivered bit rate. Further, if quality indicators are available, then an aggregate quality across the different users can be optimized. Additionally, according to at least one example embodiment, equal resource allocation can be achieved.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of allocating resources for transmitting content from a network element in a communications network to one or more mobile devices each in communication with the network element, the method comprising:
    receiving, at the network element, characteristic information corresponding to each of the one or more mobile devices;
    generating one or more adaptive guaranteed bit rate (AGBR) values at the network element corresponding to each of the one or more mobile devices, respectively, the AGBR values being GBR values generated for each of the one or more mobile devices based on the corresponding characteristic information;
    executing at the network element a first scheduling algorithm based on the one or more AGBR values; and
    allocating resources to the one or more mobile devices based on an output of the scheduling algorithm.

2. The method of claim 1, wherein the content is transmitted as adaptive streaming data.

3. The method of claim 1, wherein the first scheduling algorithm is a proportional fair (PF) scheduling algorithm.

4. The method of claim 1, wherein, for each of the one or more mobile devices, the corresponding characteristic information includes information indicating at least one of a downlink signal quality of the mobile device, a screen size associated with the mobile device, a screen resolution of the mobile device, a subscriber class associated with the mobile device, and a complexity of the content being transmitted from the network element to the mobile device.

5. The method of claim 1, wherein generating the one or more AGBR values includes executing a virtual scheduling algorithm at the network element by,
    determining, for each of the one or more mobile devices, a quality map mapping a relationship between a rate at which the content is transmitted to the mobile device and a resulting quality of the content transmitted to the mobile device, the quality map being determined based on the characteristic information corresponding to the mobile device,
    generating the one or more AGBR values based on the one or more quality maps, and
    outputting the generated one or more AGBR values for use by the first scheduling algorithm.

6. The method of claim 5, wherein executing the virtual scheduling algorithm further includes generating the AGBR values for each of the one or more mobile devices such that an output of an objective function is optimized, the objective function being a representation of an aggregate quality of the content respectively transmitted to each of the one or more mobile devices.

7. The method of claim 5 wherein the executing the first scheduling algorithm includes executing the first algorithm for each of a plurality of consecutive time slots,
    the virtual scheduling algorithm includes executing the virtual scheduling algorithm for each of the plurality of consecutive time slots, and
    the virtual scheduling algorithm outputs the generated AGBR values for use by the first scheduling algorithm only at an interval equal to a plurality of the time slots.

8. The method of claim 5, wherein, for each of the one or more mobile devices, outputting the generated AGBR value corresponding to the mobile device includes,
    modifying the generated AGBR value such that a difference between a magnitude of the modified AGBR value and a magnitude of a current GBR value being used by the first scheduling algorithm for the mobile device is less than a threshold value, and
    outputting the modified AGBR value for use by the first scheduling algorithm.

9. The method of claim 8, wherein, for each of the one or more mobile devices, the generated AGBR value is modified such that the difference is equal to one of an increase in value equal to the threshold with respect to the current GBR value, a decrease in value equal to the threshold with respect to the current GBR value, or no change in value with respect to the current GBR value.

10. The method of claim 1, wherein the network element is a base station.

11. An network apparatus configured to allocate resources for transmitting content from the network apparatus to one or more mobile devices each in communication with the network apparatus, the apparatus comprising:
- a receiver unit configured to receive data;
- a transmitting unit configured to transmit data;
- a memory unit configured to store parameters corresponding with characteristics of the one or more mobile devices; and
- a processing unit coupled to the transmitting unit, the receiving unit, and the memory unit and configured to control operations associated with allocating resources to the one more mobile devices, the operations including,
  - receiving, at the network element, characteristic information corresponding to each of the one or more mobile devices,
  - generating one or more adaptive guaranteed bit rate (AGER) values at the network element corresponding to each of the one or more mobile devices, respectively, the AGBR values being GBR values generated for each of the one or more mobile devices based on the corresponding characteristic information,
  - executing at the network element a first scheduling algorithm based on the one or more AGBR values, and
  - allocating resources to the one or more mobile devices based on an output of the scheduling algorithm.

12. The network apparatus of claim 11, wherein the content is transmitted as adaptive streaming data.

13. The network apparatus of claim 11, wherein the first scheduling algorithm is a proportional fair (PF) scheduling algorithm.

14. The network apparatus of claim 11, wherein, for each of the one or more mobile devices, the corresponding characteristic information includes information indicating at least one of a downlink signal quality of the mobile device, a screen size associated with the mobile device, a screen resolution of the mobile device, a subscriber class associated with the mobile device, and a complexity of the content being transmitted from the network element to the mobile device.

15. The network apparatus of claim 11, wherein the processing unit is configured such that generating the one or more AGBR values includes executing a virtual scheduling algorithm at the network element by
  - determining, for each of the one or more mobile devices, a quality map mapping a relationship between a rate at which the content is transmitted to the mobile device and a resulting quality of the content transmitted to the mobile device, the quality map being determined based on the characteristic information corresponding to the mobile device,
  - generating the one or more AGBR values based on the one or more quality maps, and
  - outputting the generated one or more AGBR values for use by the first scheduling algorithm.

16. The network apparatus of claim 15, wherein the processing unit is configured such that executing the virtual scheduling algorithm further includes generating the AGBR values for each of the one or more mobile devices such that an output of an objective function is optimized, the objective function being a representation of an aggregate quality of the content respectively transmitted to each of the one or more mobile devices.

17. The network apparatus of claim 15 wherein the processing unit is configured such that
  - executing the first scheduling algorithm includes executing the first algorithm for each of a plurality of consecutive time slots,
  - the executing the virtual scheduling algorithm includes executing the virtual scheduling algorithm for each of the plurality of consecutive time slots, and
  - the virtual scheduling algorithm outputs the generated AGBR values for use by the first scheduling algorithm only at an interval equal to a plurality of the time slots.

18. The network apparatus of claim 15, wherein the processing unit is configured such that, for each of the one or more mobile devices, outputting the generated AGBR value corresponding to the mobile device includes
  - modifying the generated AGBR value such that a difference between a magnitude of the modified AGBR value and a magnitude of a current GBR value being used by the first scheduling algorithm for the mobile device is less than a threshold value, and
  - outputting the modified AGBR value for use by the first scheduling algorithm.

19. The network apparatus of claim 18, wherein the processing unit is configured such that, for each of the one or more mobile devices, the generated AGBR value is modified such that the difference is equal to one of an increase in value equal to the threshold with respect to the current GBR value, a decrease in value equal to the threshold with respect to the current GBR value, or no change in value with respect to the current GBR value.

20. The network apparatus of claim 11, wherein the network element is a base station.

* * * * *

UNITED STATES PATENT AND TRADEMARK OFFICE
CERTIFICATE OF CORRECTION

PATENT NO. : 9,456,387 B2
APPLICATION NO. : 13/253368
DATED : September 27, 2016
INVENTOR(S) : Harish Viswanathan et al.

It is certified that error appears in the above-identified patent and that said Letters Patent is hereby corrected as shown below:

On the Title Page

Column 1, Item (75) should read:

(75) Inventors  Harish Viswanathan, Morristown, NJ (US); Nandu Gopalakrishnan, Chatham, NJ (US); Mark M. Clougherty, Chatham, NJ (US); Andre Beck, Batavia, IL (US); Gang Li, Bridgewater, NJ (US); Danny De Vleeschauwer, Evergem (BE); Steve A. Benno, Towaco, NJ (US); Ashok N. Rudrapatna, Basking Ridge, NJ (US)

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*